(12) United States Patent  
Lester et al.

(10) Patent No.: US 12,388,771 B2  
(45) Date of Patent: Aug. 12, 2025

(54) BOT RESPONSE GENERATION WITH DYNAMICALLY-CHANGING WEBSITE OR NATIVE APPLICATION

(71) Applicant: LIVEPERSON, INC., New York, NY (US)

(72) Inventors: Robert Lester, Monclair, NJ (US); Jon Borgese, New York, NY (US); Augusto Garcia, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 18/101,244

(22) Filed: Jan. 25, 2023

(65) Prior Publication Data

US 2023/0388255 A1 Nov. 30, 2023

Related U.S. Application Data

(63) Continuation of application No. 17/390,061, filed on Jul. 30, 2021, now Pat. No. 11,595,325, which is a continuation of application No. 16/390,896, filed on Apr. 22, 2019, now abandoned.

(60) Provisional application No. 62/661,571, filed on Apr. 23, 2018.

(51) Int. Cl.
| | |
|---|---|
| *H04L 51/02* | (2022.01) |
| *G06F 3/0483* | (2013.01) |
| *G06N 20/00* | (2019.01) |
| *H04L 51/04* | (2022.01) |

(52) U.S. Cl.  
CPC ............ *H04L 51/02* (2013.01); *G06F 3/0483* (2013.01); *G06N 20/00* (2019.01); *H04L 51/04* (2013.01)

(58) Field of Classification Search  
CPC ....... H04L 51/02; H04L 51/04; G06F 3/0483; G06F 40/295; G06N 20/00; G06N 5/025; G06Q 30/0269  
USPC ......................................................... 709/206  
See application file for complete search history.

(56) References Cited

U.S. PATENT DOCUMENTS

| | | | |
|---|---|---|---|
| 11,375,256 B1* | 6/2022 | Dorner ..................... G06N 3/04 |
| 2012/0023419 A1* | 1/2012 | Kannan ............... G06F 3/04817 |
| | | | 715/758 |
| 2014/0019443 A1* | 1/2014 | Golshan .............. G06F 16/9535 |
| | | | 707/723 |
| 2017/0180276 A1* | 6/2017 | Gershony ............. H04L 51/222 |
| 2018/0239837 A1* | 8/2018 | Wang ................ G06F 16/90335 |
| 2019/0052584 A1* | 2/2019 | Barve .................... G06Q 10/04 |

* cited by examiner

*Primary Examiner* — Tan Doan  
(74) *Attorney, Agent, or Firm* — POLSINELLI LLP

(57) ABSTRACT

Systems and methods provide a conversational website or native application. The conversational website or native application includes an interface that enables a network device to exchange one or more messages with a bot or a terminal device (operated by a live agent) during a communication session. The interface may include a communication area (e.g., a portion of the screen) and a dynamic content area (e.g., another portion of the screen). The content of a message received from the network device may be used to select dynamic content to display in the dynamic content area. Dynamic updating of content displayed in the dynamic content area occurs continuously as messages are exchanged during the communication session.

21 Claims, 13 Drawing Sheets

BOT RESPONSE GENERATION WITH DYNAMICALLY-CHANGING WEBSITE OR NATIVE APPLICATION

CROSS-REFERENCE TO RELATED APPLICATIONS

This application is a continuation of U.S. patent application Ser. No. 17/390,061 filed Jul. 30, 2021, which is a continuation of U.S. patent application Ser. No. 16/390,896 filed on Apr. 22, 2019, which claims the benefit of U.S. Provisional Patent Application No. 62/661,571, filed Apr. 23, 2018. The disclosures each of (1) U.S. Provisional Patent Application No. 62/502,535, filed on May 5, 2017, and (2) U.S. Provisional Patent Application No. 62/502,572, filed on May 5, 2017, are hereby incorporated by reference in its entirety for all purposes.

FIELD

The present disclosure relates generally to displaying dynamic websites or native applications. More specifically, techniques are provided to dynamically update a website or native application in real-time based on messages exchanged in a communication session between a network device and a terminal device or bot.

BACKGROUND OF THE INVENTION

Networks, such as the Internet, have become an increasingly important part of our everyday lives. Millions of people now access the Internet on a daily basis to shop for goods and services and obtain information of interest.

The web is built on a very simple, but powerful premise. Much of the material on the web is formatted in a general, uniform format called HTML (Hypertext Markup Language) or the like, and all information requests and responses conform to a similarly standard protocol. When someone accesses a server on the Web, the user's Web browser will send an information request to a Web server. The Web server will respond to the request by transmitting the desired information to the user's computer. There, the user's browser will display the received information on the user's screen.

Some Web services allow users to initiate or join communication sessions with other users. These communication sessions are typically text-only boxes that allow messages to be exchanged.

BRIEF SUMMARY OF THE INVENTION

Systems and methods provide a conversational website or native application. The conversational website or native application includes an interface that enables a network device to exchange one or more messages with a bot or a terminal device (operated by a live agent) during a communication session. The interface may include a communication area (e.g., a portion of the screen) and a dynamic content area (e.g., another portion of the screen). The communication area may be configured to display the messages exchanged between the network device and the bot or terminal device during the communication session. The dynamic content area displayed dynamically-updating content based on the messages received from the network device or the bot (or terminal device). For example, the content of a message received from the network device may be used to select dynamic content to display in the dynamic content area. When a subsequent message is received from the network device, the content of the subsequent message is used to select new dynamic content to update the dynamic content area. This dynamic updating of content displayed in the dynamic content area occurs continuously as messages are exchanged during the communication session.

In some embodiments, a computer-implemented method is provided. The method comprises displaying an interface including a communication area and a dynamic content area. The communication area is configured to display one or more messages of a communication session. The dynamic content area is configured to dynamically display one or more content elements according to the one or more messages of the communication session. The method further comprises receiving a message during the communication session. When the message is received from a network device, an attribute of the message is identified. The method further comprises determining at least one content element to display in the dynamic content area. Determining includes using the identified attribute. The method further comprises displaying the at least one content element in the dynamic content area of the interface. The method further comprises receiving a new message. When the new message is received from the network device, a new attribute of the new message is used to identify a new content element to display in the dynamic content area. The dynamic content area is updated to display new content data included in the new content element.

In some embodiments, a system is provided. The system comprises one or more data processors. The system further comprises a non-transitory computer-readable storage medium containing instructions which, when executed on the one or more data processors, cause the one or more data processors to perform operations including the steps of the above method.

In some embodiments, a computer-program product is provided. The computer-program product is tangibly embodied in a non-transitory machine-readable storage medium, including instructions configured to cause a data processing apparatus to perform operations including the steps of the above method.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
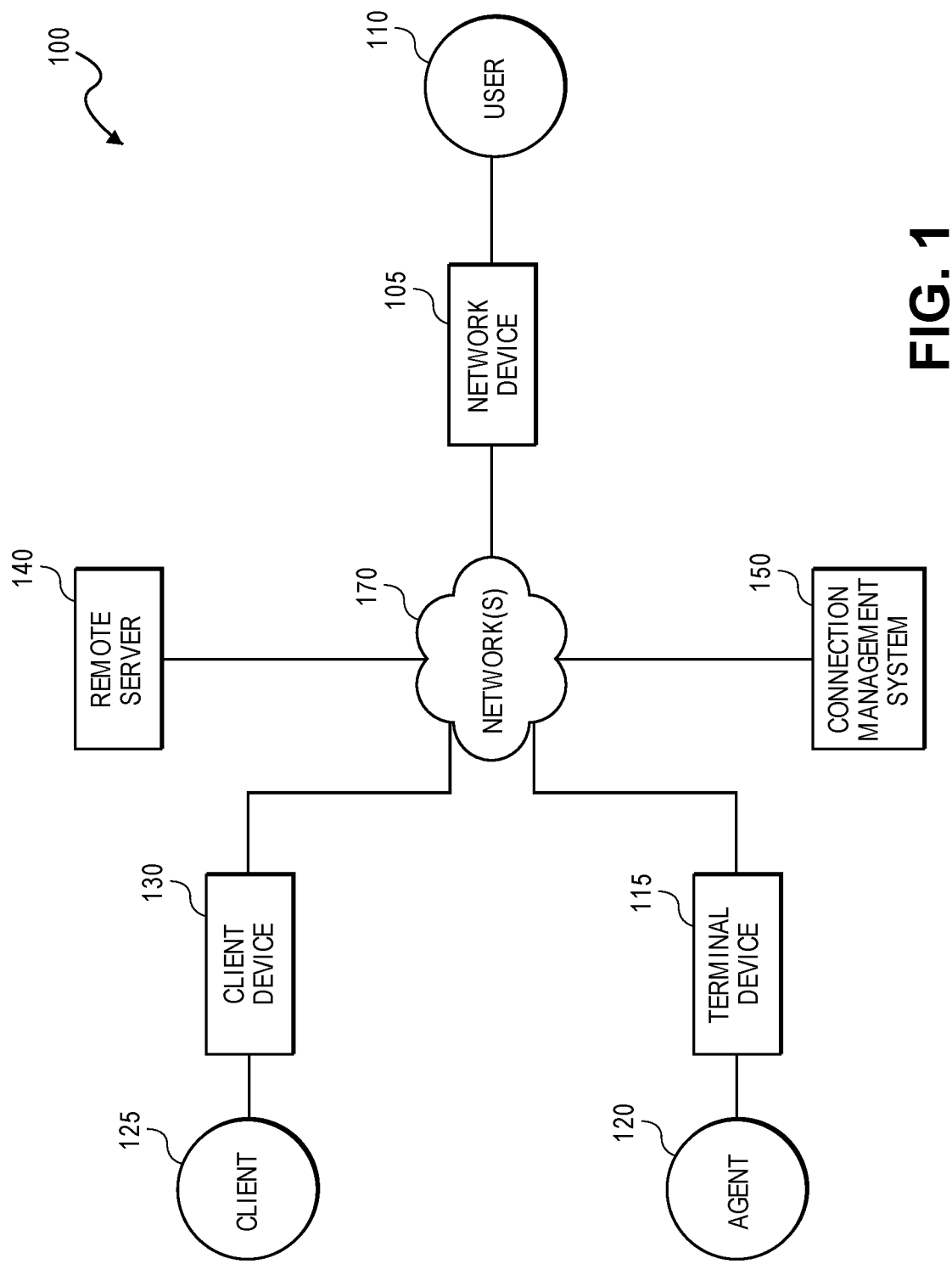
FIG. 1 shows a block diagram of an embodiment of a network interaction system.

FIG. 1 shows a block diagram of an embodiment of a network interaction system 100 which implements and supports certain embodiments and features described herein. Certain embodiments relate to establishing a connection channel between a network device 105 (which can be operated by a user 110) and a terminal device 115 (which can be operated by an agent 120). In certain embodiments, the network interaction system 100 can include a client device 130 associated with a client 125.

In certain embodiments, a user 110 can be an individual browsing a web site or accessing an online service provided by a remote server 140. A client 125 can be an entity that provides, operates, or runs the web site or the online service, or individuals employed by or assigned by such an entity to perform the tasks available to a client 125 as described herein. The agent 120 can be an individual, such as a support agent or sales associate tasked with providing support or information to the user 110 regarding the website or online service (e.g., information about products available at an online store). Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual shopping an online store from a personal computing device, a client 125 can be a company that sells products online, and an agent 120 can be a sales associate employed by the company. In various embodiments, the user 110, client 125, and agent 120 can be other individuals or entities.

While FIG. 1 shows only a single network device 105, terminal device 115 and client device 130, an interaction system 100 can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connection channels between network device 105 and one or more terminal devices 115. For example, upon receiving a communication from network device 105, connection management system 150 can first estimate to which client (if any) the communication corresponds. Upon identifying a client, connection management system 150 can identify a terminal device 115 associated with the client for communication with network device 105. In some instances, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message. The identification of the terminal device 115 can include a technique described, for example, in U.S. application Ser. No. 12/725,799, filed on Mar. 17, 2010, which is hereby incorporated by reference in its entirety for all purposes.

In some instances, connection management system 150 can determine whether any connection channels are established between network device 105 and a terminal device associated with the client (or remote server 140) and, if so, whether such channel is to be used to exchange a series of communications including the communication.

Upon selecting a terminal device 115 to communicate with network device 105, connection management system 150 can establish a connection channel between the network device 105 and terminal device 115. In some instances, connection management system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets.

In some embodiments, connection management system 150 can monitor the communication exchange in real-time and perform automated actions (e.g., rule-based actions) based on the live communications. For example, when connection management system 150 determines that a communication relates to a particular product, connection management system 150 can automatically transmit an additional message to terminal device 115 containing additional information about the product (e.g., quantity of products in stock, links to support documents related to the product, or other information about the product or similar products).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
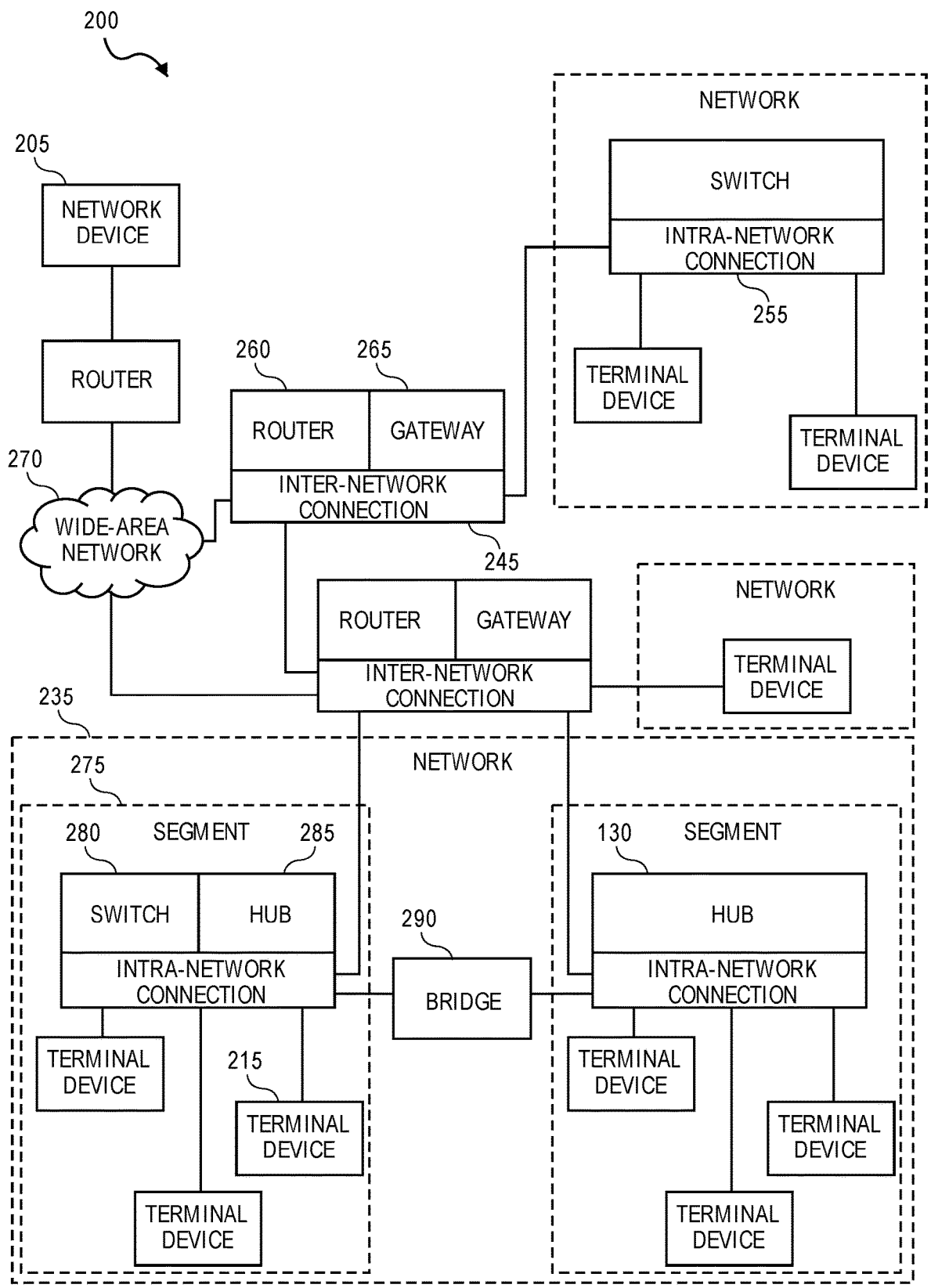
FIG. 2 shows a block diagram of another embodiment of a network interaction system.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some instances, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
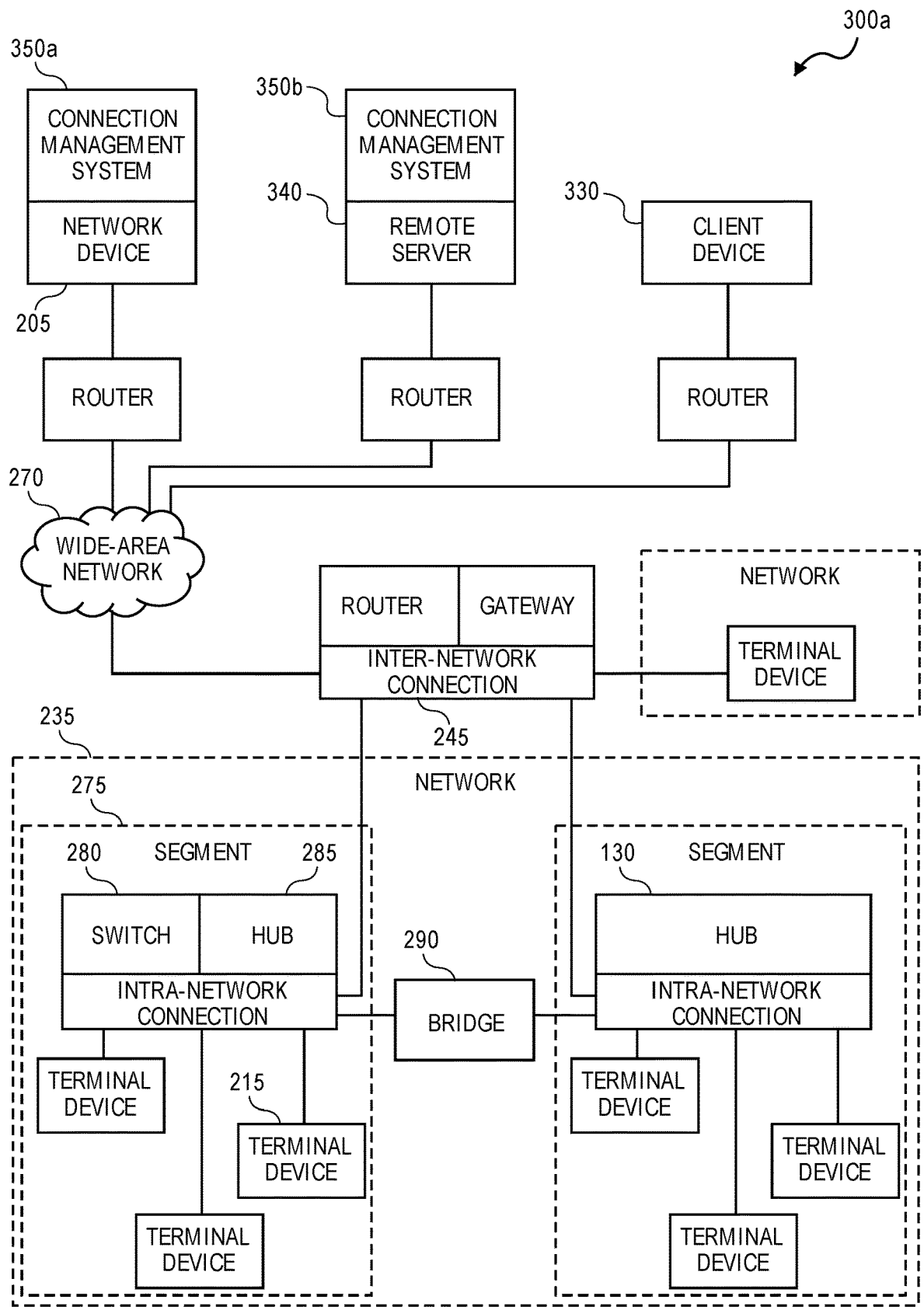
FIGS. 3A-3C show block diagrams of other embodiments of a network interaction system that includes a connection management system.
Figure 3B:
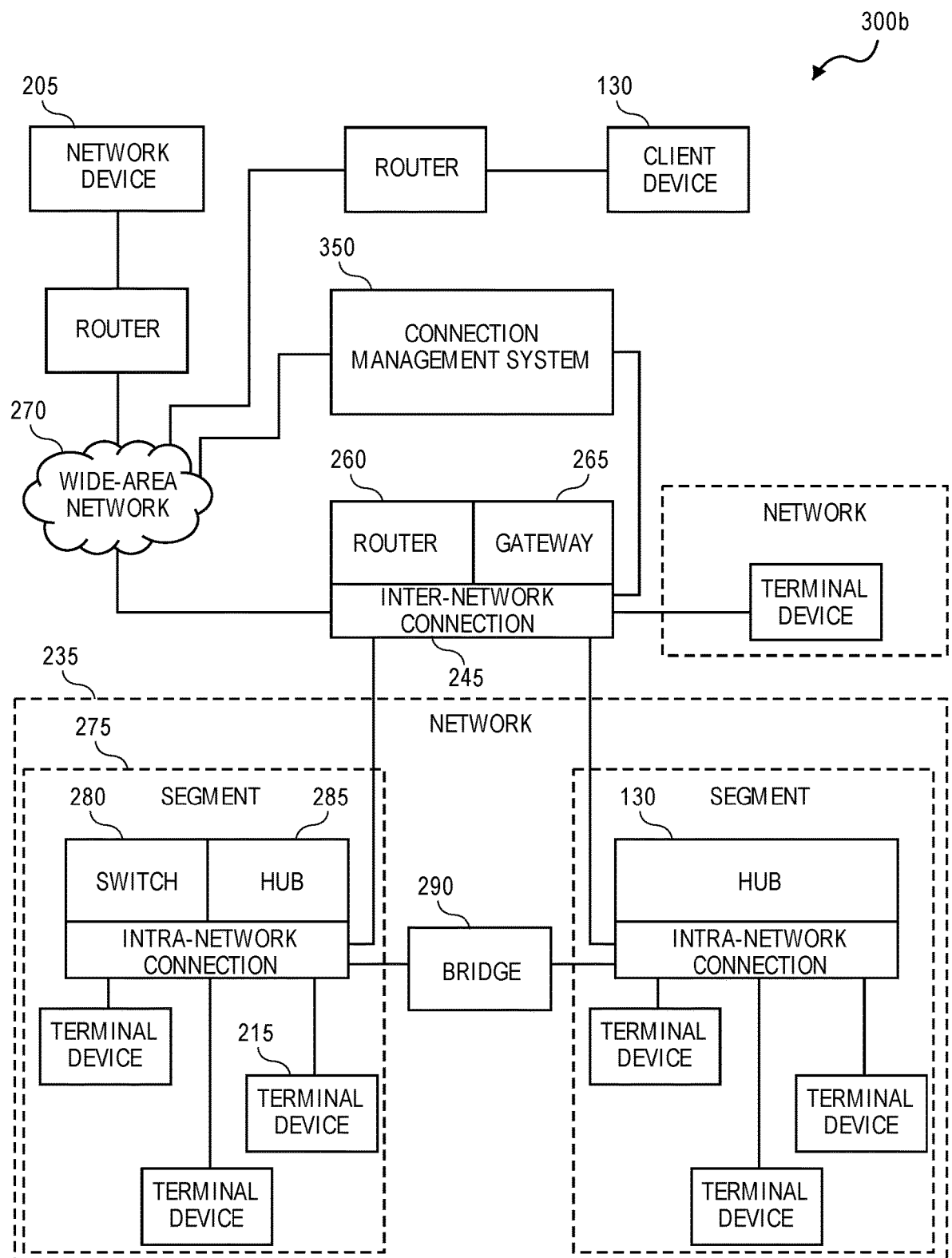
Figure 3C:
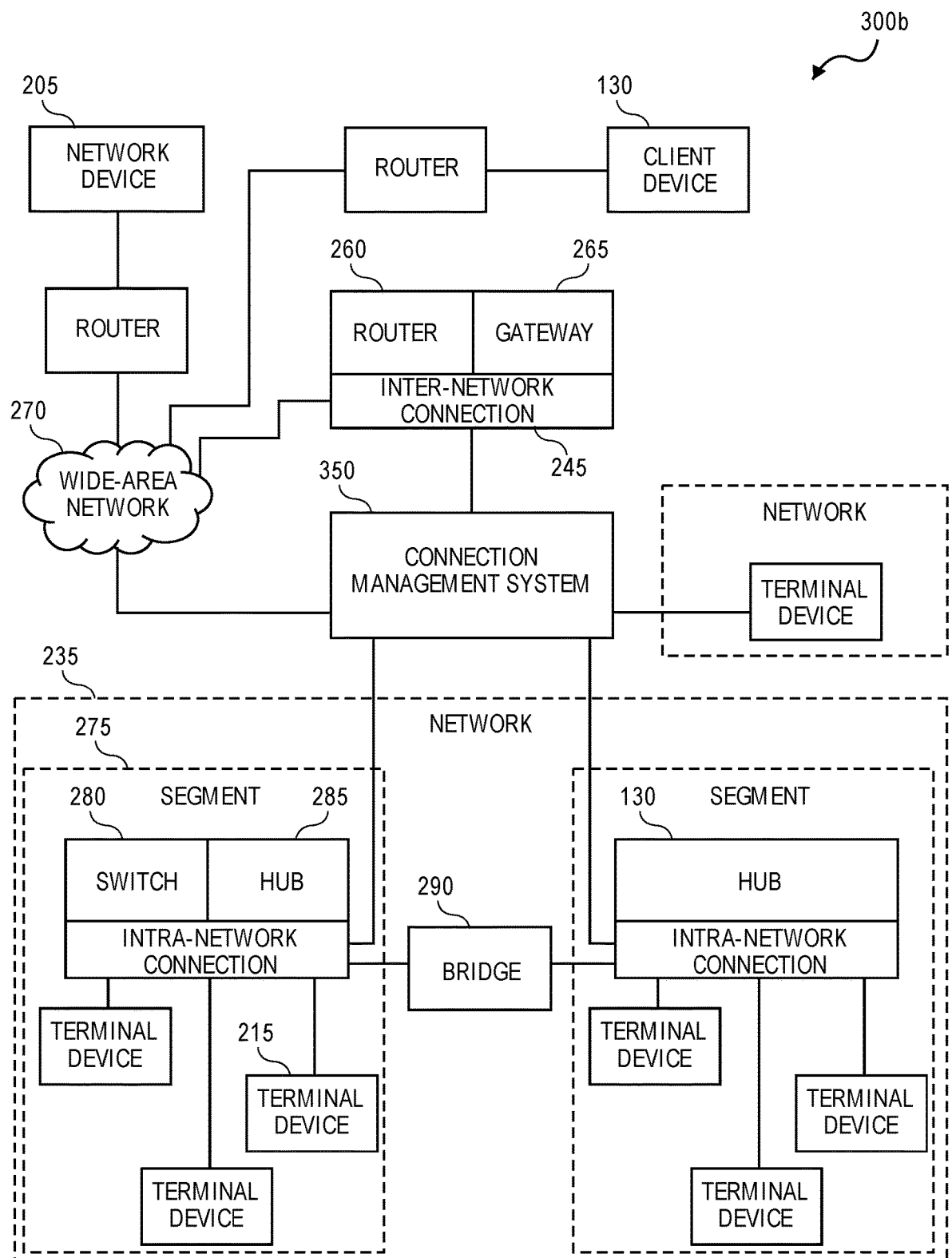

FIGS. 3A-3C show block diagrams of other embodiments of a network interaction system 300a-c that includes a connection management system. Each of the depicted systems 300a-c show only 2 local-area networks 235 for simplicity, though it can be appreciated that embodiments can be extended to expand the number of local-area networks. Each of systems 300a-c include a connection management system 350, which can identify which terminal device is to communicate with network device 205, can establish and manage (e.g., maintain or close) connection channels, can determine whether and when to re-route communications in an exchange, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350a is associated with network device 205 and connection management system 350b is associated with remote server 340). For example, connection management system 350a and/or connection management system 350b can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing and so on.

Connection management system 350b executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, communication management system 350b may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 350 can be configured to serve as a relay and/or destination address. Thus, for example, a set of network devices 205 may transmit communications, each identifying connection management system 350 as a destination. Connection management system 350 can receive each communication and can concurrently monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or complementary applications (e.g., executing on one or more other components, network devices or remotes servers).

Figure 4:
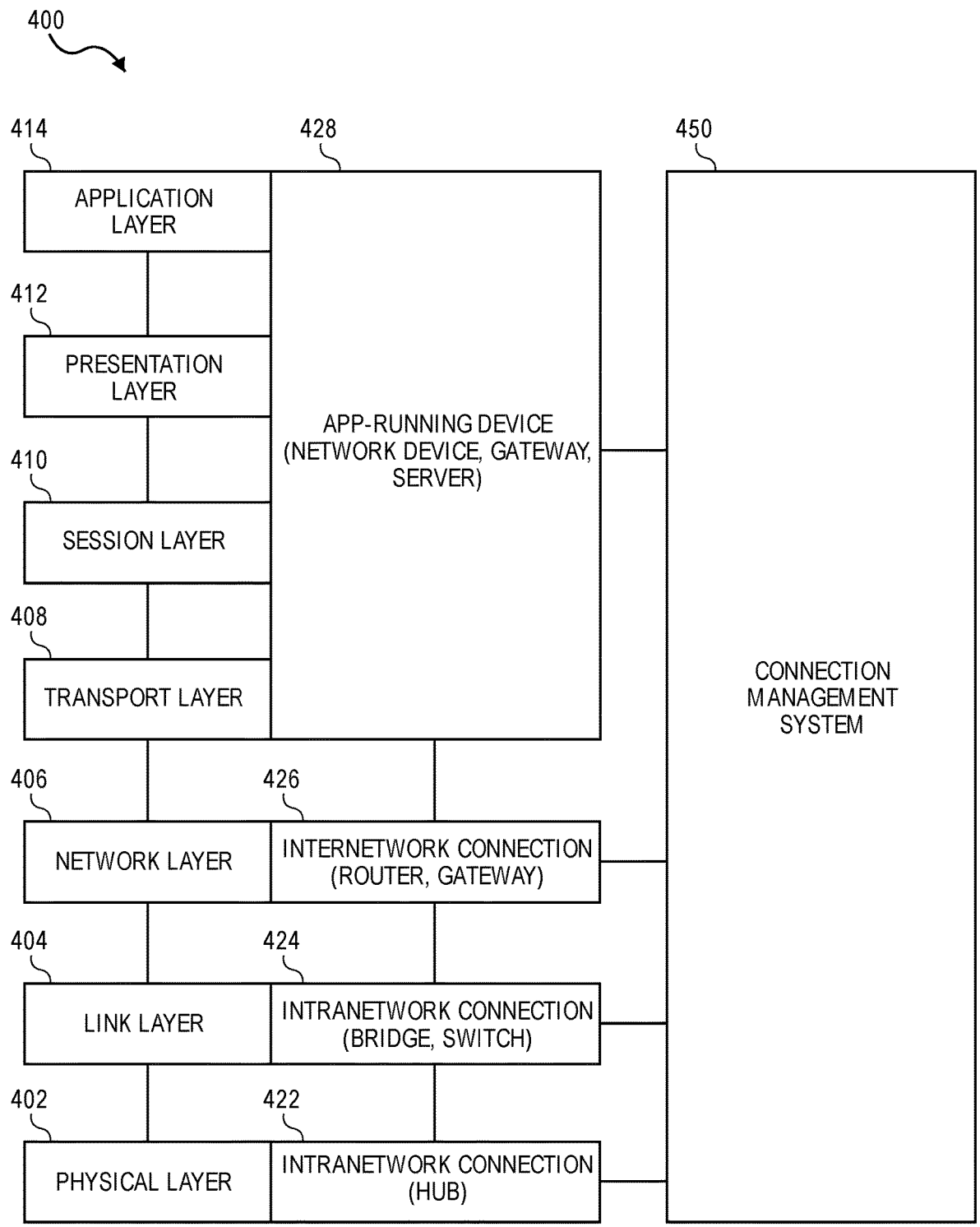
FIG. 4 shows a representation of a protocol-stack mapping of connection components' operation.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5:
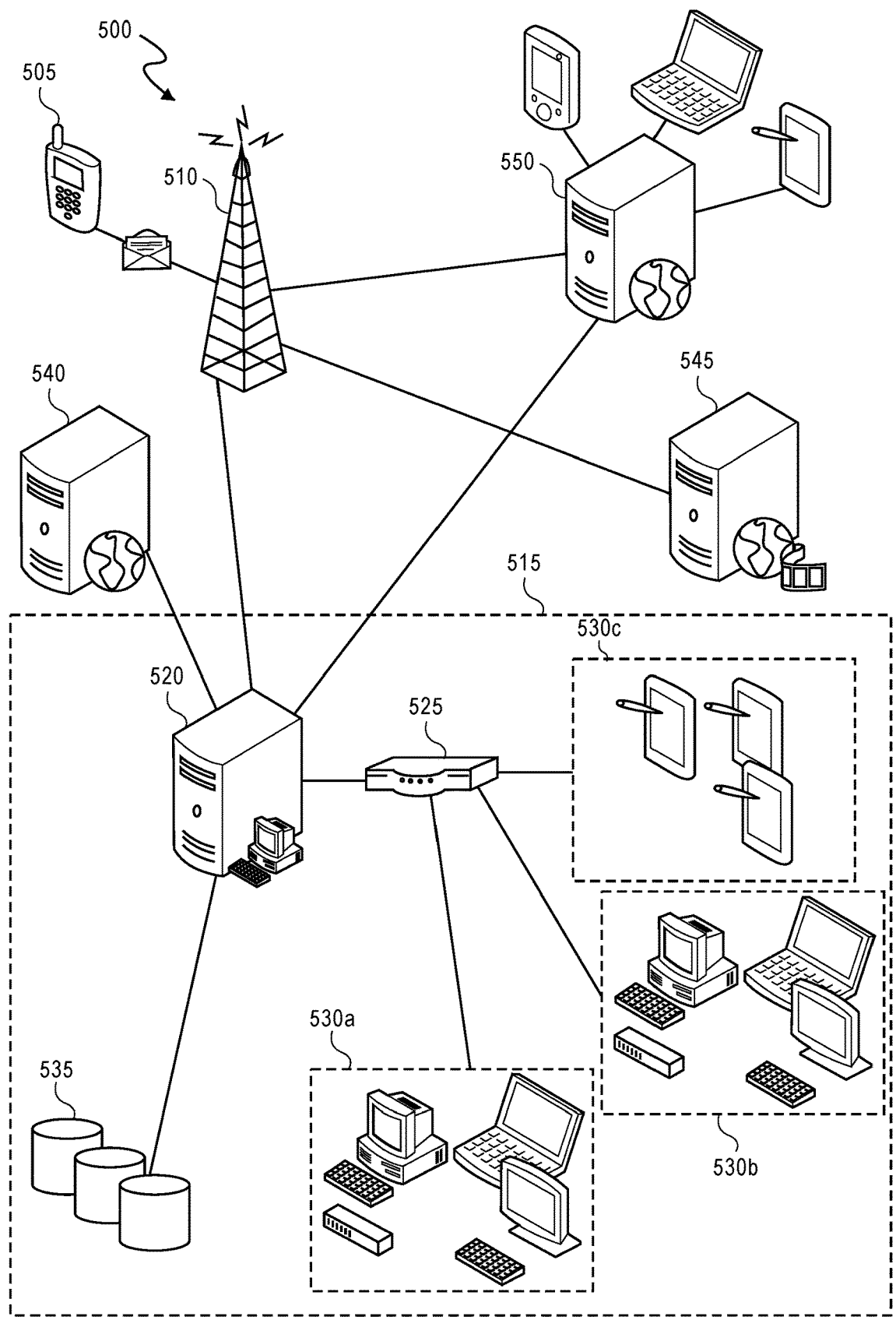
FIG. 5 represents a multi-device communication exchange system according to an embodiment.

FIG. 5 represents a multi-device communication exchange system 500 according to an embodiment. System 500 includes a network device 505 configured to communicate with a variety of types of terminal devices over a variety of types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 5, each cluster of terminal devices 530a-c can correspond to a different client. The terminal devices may be geographically co-located or disperse. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may collect, analyze and/or store data from or pertaining to communications, terminal-device operations, client rules, and/or user-associated actions (e.g., online activity, account data, purchase history, etc.) at one or more data stores. Such data may influence communication routing.

Notably, various other devices can further be used to influence communication routing and/or processing. For example, in the depicted instance, connection management system 520 also is connected to a web server 540. Thus, connection management system 540 can retrieve data of interest, such as technical product details, news, current product offerings, current or predicted weather, and so on.

Network device 505 may also be connected to a web server (e.g., including a streaming web server 545). In some instances, communication with such a server provided an initial option to initiate a communication exchange with connection management system 520. For example, network device 505 may detect that, while visiting a particular webpage, a communication opportunity is available and such an option can be presented.

One or more elements of communication system 500 can also be connected to a social-networking server 550. Social networking server 550 can aggregate data received from a variety of user devices. Thus, for example, connection management system 520 may be able to estimate a general (or user-specific) sentiment towards a given topic or estimate a general behavior of a given user or class of users.

Figure 6:
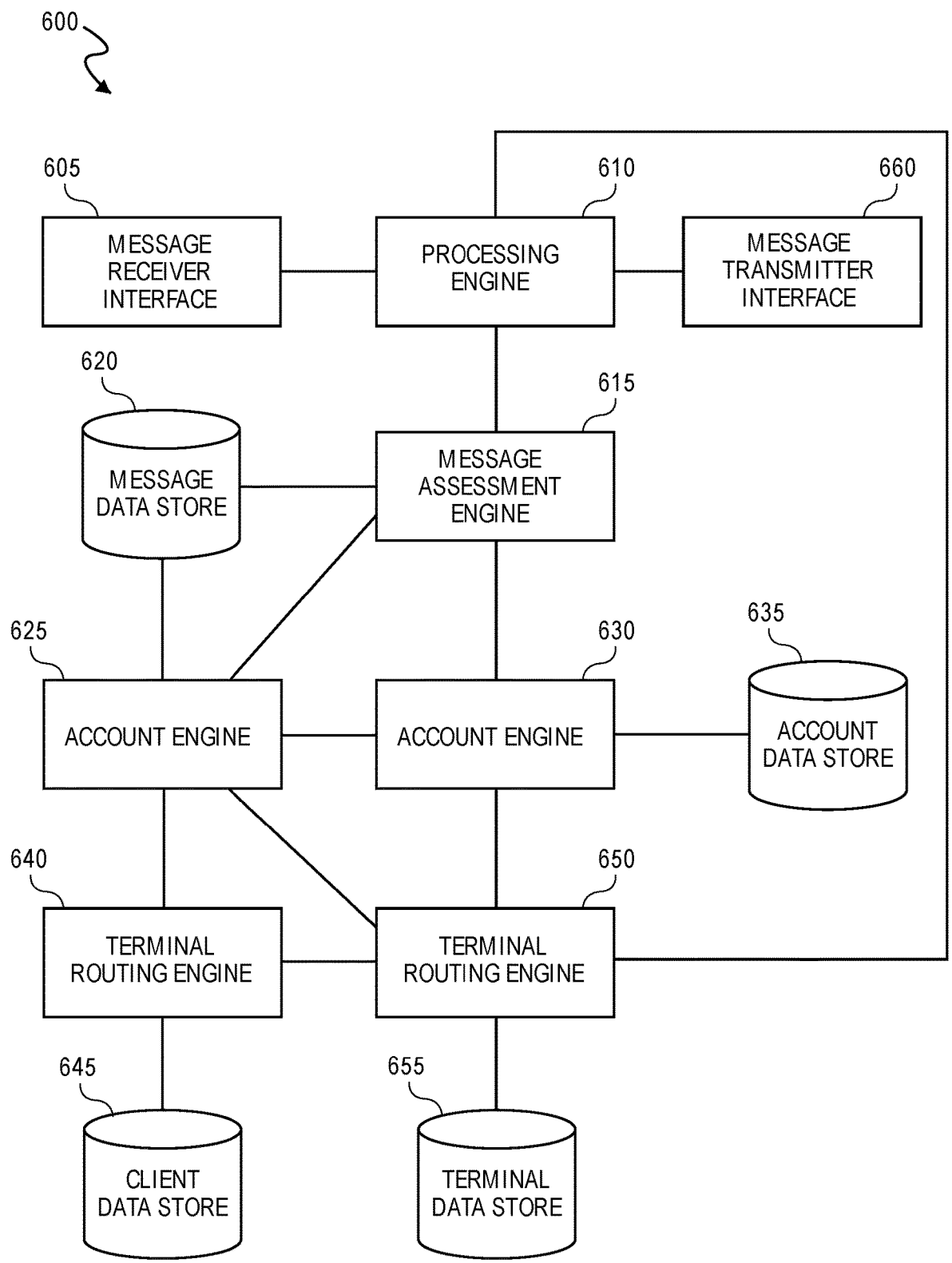
FIG. 6 shows a block diagram of an embodiment of a connection management system.

FIG. 6 shows a block diagram of an embodiment of a connection management system 600. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate exchange, which can include a series of messages or message exchange being routed between two devices (e.g., a network device and terminal device). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some instances, the message can include or be associated with an identifier of a client. For example, the message can explicitly identify the client (or a device associated with the client); the message can include or be associated with a webpage or app page associated with the client; the message can include or be associated with a destination address associated with a client; or the message can include or be associated with an identification of an item (e.g., product) or service associated with the client (e.g., being offered for sale by the client, having been sold by the client or being one that the client services). To illustrate, a network device may be presenting an app page of a particular client, which may offer an option to transmit a communication to an agent. Upon receiving user input corresponding to a message, a communication may be generated to include the message and an identifier of the particular client.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A message assessment engine 615 may assess the (e.g., extracted or received) message. The assessment can include identifying, for example, one or more categories or tags for the message. Examples of category or tag types can include (for example) topic, sentiment, complexity, and urgency. A difference between categorizing and tagging a message can be that categories can be limited (e.g., according to a predefined set of category options), while tags can be open. A topic can include, for example, a product, a service, a technical issue, a use question, a complaint, a refund request or a purchase request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some instances, message assessment engine 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 615 can store a message, message metric and/or message statistic in a message data store 620. Each message can also be stored in association with other data (e.g., metadata), such as data identifying a corresponding source device, destination device, network device, terminal device, client, one or more categories, one or more stages and/or message-associated statistics). Various components of connection management system 600 (e.g., message assessment engine 615 and/or an interaction management engine 625) can query message data store 620 to retrieve query-responsive messages, message metrics and/or message statistics.

An interaction management engine 625 can determine to which device a communication is to be routed and how the receiving and transmitting devices are to communicate. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

In some instances, when a network device (or other network device associated with a sane user or account) has previously communicated with a given terminal device (e.g., about matters relating to a client), communication routing can be generally biased towards the same terminal device. Other factors that may influence routing can include, for example, an inferred or identified user or agent sentiment pertaining to the previous communication; a topic of a present communication (e.g., and an extent to which that relates to a topic of a previous communication and/or a knowledge base associated with one or more terminal devices or agents); whether the terminal device (or corresponding agent) is available; and/or a predicted response latency of the terminal device. Such factors may be considered absolutely or relative to similar metrics corresponding to other terminal devices. A re-routing rule (e.g., a client-specific or general rule) can indicate how such factors are to be assessed and weighted to determine whether to forego agent consistency.

When a network device (or other network device associated with a same user or account) has not previously communicated with a given terminal device (e.g., about matters relating to a client), a terminal-device selection can be performed based on factors such as, for example, an extent to which various agents' knowledge base corresponds to a communication topic, availability of various agents at a given time and/or over a channel type, types and/or capabilities of terminal devices (e.g., associated with the client), a language match between a user and agents, and/or a personality analyses. In one instance, a rule can identify how to determine a sub-score to one or more factors such as these and a weight to assign to each score. By combining (e.g., summing) weighted sub-scores, a score for each agent can be determined. A terminal device selection can then be made by comparing terminal devices' scores (e.g., to select a high or highest score).

With regard to determining how devices are to communicate, interaction management engine 625 can (for example) determine whether a terminal device is to respond to a communication via (for example) email, online chat, SMS message, voice call, video chat, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more terminal devices. Appreciably, some communication types will result in real-time communication (e.g., where fast message response is expected), while others can result in asynchronous communication (e.g., where delays (e.g., of several minutes or hours) between messages are acceptable).

Further, interaction management engine 625 can determine whether a continuous channel between two devices should be established, used or terminated. A continuous channel can be structured so as to facilitate routing of future communications from a network device to a specified terminal device. This bias can persist even across message series (e.g., days, weeks or months). In some instances, a representation of a continuous channel (e.g., identifying an agent) can be included in a presentation to be presented on a network device. In this manner, a user can understand that communications are to be consistently routed so as to promote efficiency.

In one instance, a score can be generated using one or more factors described herein and a rule (e.g., that includes a weight for each of the one or more factors) to determine a connection score corresponding to a given network device and terminal device. The score may pertain to an overall match or one specific to a given communication or communication series. Thus, for example, the score may reflect a degree to which a given terminal device is predicted to be suited to respond to a network-device communication. In some instances, a score analysis can be used to identify each of a terminal device to route a given communication to and whether to establish, use or terminate a connection channel. When a score analysis is used to both address a routing decision and a channel decision, a score relevant to each decision may be determined in a same, similar or different manner.

Thus, for example, it will be appreciated that different factors may be considered depending on whether the score is to predict a strength of a long-term match versus one to respond to a particular message query. For example, in the former instance, considerations of overall schedules and time zones may be important, while in the latter instance, immediate availability may be more highly weighted. A score can be determined for a single network-device/terminal-device combination, or multiple scores can be determined, each characterizing a match between a given network device and a different terminal device.

To illustrate, a set of three terminal devices associated with a client may be evaluated for potential communication routing. A score may be generated for each that pertains to a match for the particular communication. Each of the first two terminal devices may have previously communicated with a network device having transmitted the communication. An input from the network device may have indicated satisfaction with an interaction with the communication(s) with the first device. Thus, a past-interact sub-score (as calculated according to a rule) for the first, second and third devices may be 10, 5, and 0, respectively. (Negative satisfaction inputs may result in negative sub-scores.) It may be determined that only the third terminal device is immediately available. It may be predicted that the second terminal device will be available for responding within 15 minutes, but that the first terminal device will not be available for responding until the next day. Thus, a fast-response sub-score for the first, second and third devices may be 1, 3 and 10. Finally, it may be estimated a degree to which an agent (associated with the terminal device) is knowledgeable about a topic in the communication. It may be determined that an agent associated with the third terminal device is more knowledgeable than those associated with the other two devices, resulting in sub-scores of 3, 4 and 9. In this example, the rule does not include weighting or normalization parameters (though, in other instances, a rule may), resulting in scores of 14, 11 and 19. Thus, the rule may indicate that the message is to be routed to a device with the highest score, that being the third terminal device. If routing to a particular terminal device is unsuccessful, the message can be routed to a device with the next-highest score, and so on.

A score may be compared to one or more absolute or relative thresholds. For example, scores for a set of terminal devices can be compared to each other to identify a high score to select a terminal device to which a communication can be routed. As another example, a score (e.g., a high score) can be compared to one or more absolute thresholds to determine whether to establish a continuous channel with a terminal device. An overall threshold for establishing a continuous channel may (but need not) be higher than a threshold for consistently routing communications in a given series of messages. This difference between the overall threshold and threshold for determining whether to consistently route communication may be because a strong match is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 625 can interact with an account engine 630 in various contexts. For example, account engine 630 may look up an identifier of a network device or terminal device in an account data store 635 to identify an account corresponding to the device. Further, account engine 630 can maintain data about previous communication exchanges (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, a terminal device, an account and a client. Account engine 635 can (in some instances) subsequently notify a user of the channel's existence such that the user can be aware of the agent consistency being availed.

Interaction management engine 625 can further interact with a client mapping engine 640, which can map a communication to one or more clients (and/or associated brands). In some instances, a communication received from a network device itself includes an identifier corresponding to a client (e.g., an identifier of a client, product, service, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some instances, a message may not particularly correspond to any client. For example, a message may include a general query. Client mapping engine 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 645 can include identifications of one or more terminal devices (and/or agents) associated with the client. A terminal routing engine 650 can retrieve or collect data pertaining to each of one, more or all such terminal devices (and/or agents) so as to influence routing determinations. For example, terminal routing engine 650 may maintain a terminal data store 655, which can store information such as terminal devices' device types, operating system, communication-type capabilities, installed applications accessories, geographic location and/or identifiers (e.g., IP addresses). Information can also include agent information, such as experience level, position, skill level, knowledge bases (e.g., topics that the agent is knowledgeable about and/or a level of knowledge for various topics), personality metrics, working hours, language(s) spoken and/or demographic information. Some information can be dynamically updated. For example, information indicating whether a terminal device is available may be dynamically updated based on (for example) a communication from a terminal device (e.g., identifying whether the device is asleep, being turned off/on, idle/active, or identifying whether input has been received within a time period); a communication routing (e.g., indicative of whether a terminal device is involved in or being assigned to be part of a communication exchange); or a communication from a network device or terminal device indicating that a communication exchange has ended or begun.

It will be appreciated that, in various contexts, being engaged in one or more communication exchanges does not necessarily indicate that a terminal device is not available to engage in another communication exchange. Various factors, such as communication types (e.g., message, email, chat, phone), client-identified or user-identified target response times, and/or system loads (e.g., generally or with respect to a user) may influence how many exchanges a terminal device may be involved in.

When interaction management engine 625 has identified a terminal device to involve in a communication exchange or connection channel, it can notify terminal routing engine 650, which may retrieve any pertinent data about the terminal device from terminal data store 655, such as a destination (e.g., IP) address, device type, protocol, etc. Processing engine 610 can then (in some instances) modify the message-inclusive communication or generate a new communication (including the message) so as to have a particular format, comply with a particular protocol, and so on. In some instances, a new or modified message may include additional data, such as account data corresponding to a network device, a message chronicle, and/or client data.

A message transmitter interface 660 can then transmit the communication to the terminal device. The transmission may include, for example, a wired or wireless transmission to a device housed in a separate housing. The terminal device can include a terminal device in a same or different network (e.g., local-area network) as connection management system 600. Accordingly, transmitting the communication to the terminal device can include transmitting the communication to an inter- or intra-network connection component.

Systems and methods for dynamically switching between bots and terminal devices (e.g., operated by live agents) during communication sessions with network devices (e.g., operated by users) is provided. In some implementations, bots can be configured to autonomously chat with users. Further, bots can be configured for a specific capability. Examples of capabilities can include updating database records, providing updates to users, providing additional data about the user to agents, determining a user's intent and routing the user to a destination system based on the intent, predicting or suggesting responses to agents communicating with users, escalating communication sessions to include one or more additional bots or agents, generating reports, and other suitable capabilities. In some implementations, while a bot is communicating with a user in a chat session, a communication server can automatically and dynamically determine to transfer the chat session to a terminal device. For example, bots can communicate with users about certain tasks (e.g., updating a database record associated with a user), whereas, terminal devices can communicate with users about more difficult tasks (e.g., communicating using a communication channel to solve a technical issue).

In some implementations, determining whether to transfer a chat session between the bots and the terminal devices can be based on an analysis of one or more characteristics of the messages in a communication session. Further, a dynamic sentiment score can be generated for the messages. For example, in cases where the sentiment score indicates that the user is frustrated with the bot, the system can automatically switch the bot with a terminal device to communicate with the user. See U.S. Ser. No. 15/171,525, filed Jun. 2, 2016, the disclosure of which is incorporated by reference herein in its entirety for all purposes. In some examples, determining whether to switch between the bots and terminal devices can be performed without a prompt from a user. The determination can be performed automatically at the communication server based any number of factors, including characteristics of the current messages in the chat session, characteristics of previous messages transmitted by the user in previous chat sessions, a trajectory of a characteristic (e.g., a sentiment) over multiple messages in a conversation, or additional information associated with the user (e.g., profile information, preference information, membership information, and other suitable information associated with the user).

Figure 7:
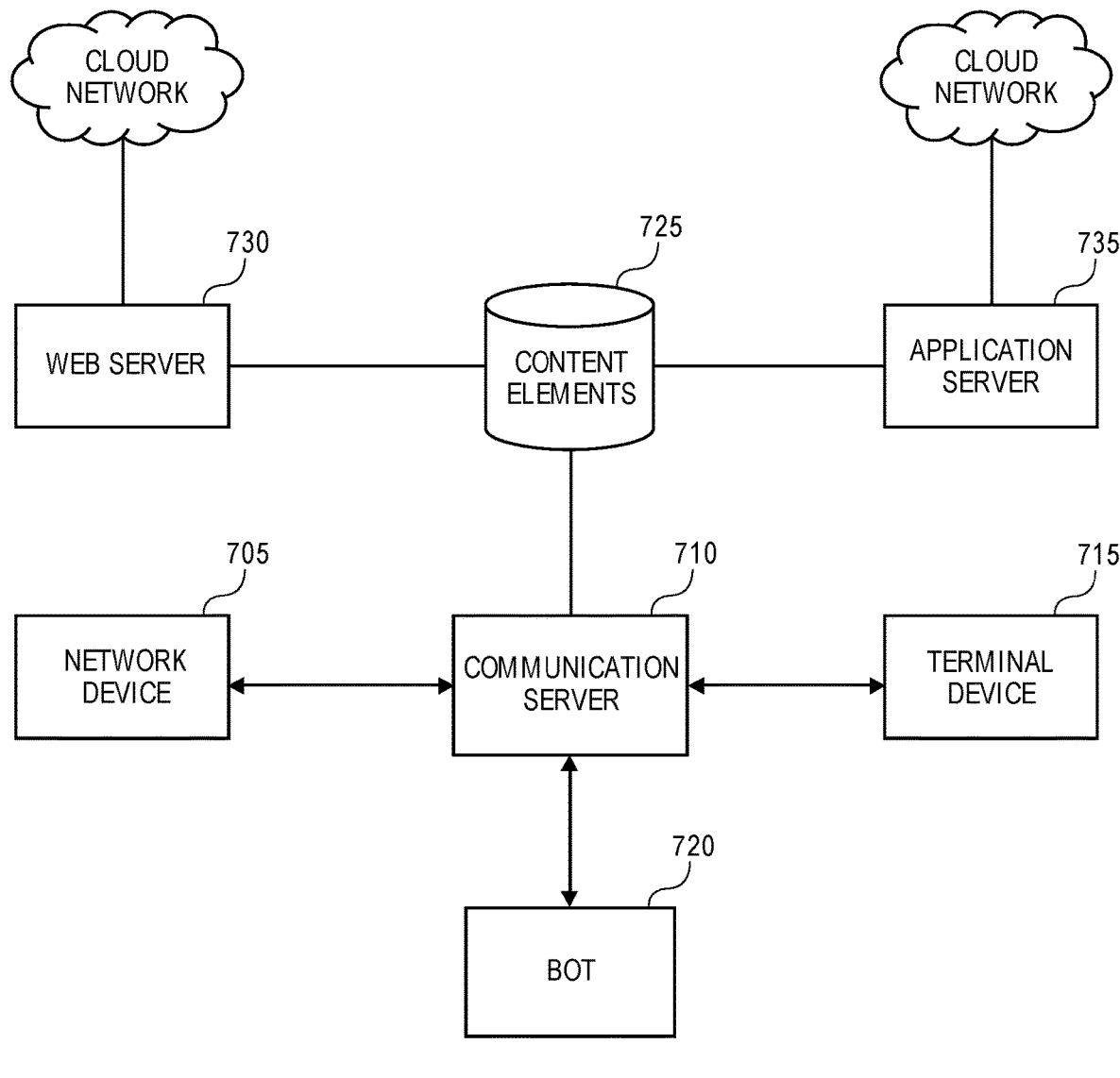
FIG. 7 shows a block diagram of a network environment for dynamically switching between bots and terminal devices during communication sessions.

FIG. 7 shows a block diagram of network environment 700 for dynamically updating content areas of a website or native application based on a conversation between a network device and a terminal device or bot. In some implementations, network environment 700 can include network device 705, communication server 710, terminal device 715, and bot agent 720. Communication server 710 can include server(s) with one or more processors configured to perform methods and techniques described herein. For example, communication server 710 can manage communication sessions between network devices and terminal devices. Network device 705 can be operated by a user, and terminal device 715 can be operated by a live agent. Communication server 710 can establish a communication channel between network device 705 and terminal device 715 so that network device 705 and terminal device 715 can communicate with each other in a chat session, for example. A chat session can facilitate the exchange of one or more messages between network device 705 and terminal device 715.

In some implementations, network environment 700 may also include web server 730 and/or application server 735. Web server 730 may be a server that hosts a website configured according to embodiments described herein. For example, web server 730 may host a conversational website that is configured to use bots (and/or live agents) to communicate with users, and dynamically update content as the user types in messages into the website's chat box. Application server 735 may be a server that hosts a native application configured to execute on mobile devices, such as smart phones. For example, application server 735 may host a conversational application that is configured to use bots (and/or live agents) to communicate with users, and dynamically update content as the user types in messages into the native application's chat function. In some implementations, web server 730 may communicate with a cloud network to modify or update the content that is available for display in the conversational website (e.g., in the dynamic content area). In some implementations, application server 735 may communicate with a cloud network to modify or update the content that is available for display in the conversational application (e.g., in the dynamic content area).

In some implementations, communication server 710 can establish a communication channel between network device 705 and bot agent 720. Bot agent 720 can be code that, when executed, is configured to autonomously communicate with network device 705. For example, bot agent 720 can be a bot that automatically generates messages to initiate conversations with the user associated with network device 705 and/or to automatically respond to messages from network device 705. In addition, communication server 710 can be associated with a platform. Clients (e.g., an external system to the platform) can deploy bots in their internal communication systems using the platform. In some examples, clients can use their own bots in the platform, which enables clients to implement the methods and techniques described herein into their internal communication systems.

In some implementations, network environment 700 may include content elements data store 725. Content elements data store 725 may be a database that stores a plurality of displayable content elements. For example, displayable content elements can include content data that can cause a processor to display a content area on a website or native application (see e.g., element 810A in FIG. 8A). Examples of content data may include an interactive or non-interactive website, a portion of an interactive or non-interactive website, an image, a video clip, a link to a website, a thumbnail image that links to a website, a link to a native application, a thumbnail image that links to a native application, an embedded file (e.g., a document), a link to a file, a link to a web application, and other suitable content data. Advantageously, as the user operating network device 705 communicates with bot 720 for example, the messages exchanged between network device 705 and bot 720 may be displayed in the communication area of the website or native application. Further, as user communicates with bot 720, the content displayed in the dynamic content area of the website or native application automatically updates. The content area updates with content that is associated with the messages being exchanged between network device and bot 720.

In some implementations, some or all of the plurality of content elements stored in a database (e.g., content element data store) can be tagged with an attribute tag. For example, an attribute tag may be code that represents a particular attribute. A plurality of attribute tags may exist, and each attribute tag of the plurality of attributes may correspond to an attribute. As a non-limiting example, a first content element may include an image, text, and a link to a checkout page of a webpage. The first content element may be associated with an attribute tag of "checkout." As another non-limiting example, a second content element may include video clip of a new mobile phone and text associated with the video clip. The second content element may be associated with an attribute tag of "new mobile phone product." The attribute tag associated with a content element may be stored in a manner that links or points to the corresponding content element. It will be appreciated that the content elements may be stored in any manner as long as each stored content element can link or point to or is stored with the corresponding attribute tag. It will be appreciated that the attribute tag may be determined manually or automatically based on the content of the content element. For example, for the first content element, an algorithm may identify that the link included in the first content element is associated with a checkout page, and thus, the attribute tag associated with the first content element can be determined as a "checkout" tag.

Communication server 710 may receive a message from network device 705. As a non-limiting example, the message may include text, such as "I would like to get help with a technical issue." Communication server 710 can perform textual or content analysis on the received message. In this non-limiting example, communication server 710 may perform to textual analysis on the incoming message to determine an intent of the message. For example, after performing the textual analysis, communication server 710 may determine that the message is associated with the intent of "solving a technical issue." Further, communication server 710 may access content elements data store 725 to query for content elements associated with the attribute tag of "solving a technical issue." As a result of the querying, communication server 710 may retrieve one or more content elements associated with the attribute tag of "solving a technical issue" and relating to technical support. For example, the content element may include a step-by-step guide to solving the technical issue. As another example, the content element may include a video clip showing how to solve the technical issue. As yet another example, the content element may include a bot that is configured to autonomously communicate with the user to assist in solving the technical issue. Web server 730 may display the retrieved content element in the dynamic content area of a conversational website. Application server 735 may display the retrieved content element in the dynamic content area of a conversational application. Displaying a content element may include displaying the content data included in the content element. For example, a content element may include content data that represents an image. Displaying the content element may include displaying the image included in the content data.

In addition, terminal device 715 can be operated by an agent. In some instances, the agent can access a website using a browser that is running on terminal device 715. For example, the website can include a console that is running on the browser of terminal device 715. The agent can be logged into the console using the browser. One or more log-in credentials (e.g., username, password, and the like) can be used to authenticate the agent's identity before allowing the agent to gain access to the console or web applications included in the console. Examples of a console can include a platform that includes one or more APIs (application programming interfaces), a dashboard including one or more functions, a web-hosted application running on a web browser (without the need for downloading plug-ins) that is capable of establishing or joining a communication session, and other suitable interfaces. Further, the console can include one or more web applications or functions that can be executed. The web applications or functions can be executed at the browser, at communication server 710, a local server, a remote server, or other suitable computing device. For example, the web applications, native applications, or functions can enable an agent to communicate with a user, and to view communications between the user and one or more bot agents.

In some implementations, communication server 710 can be configured to dynamically switch between bot agent 720 and terminal device 715 in a particular chat session. For example, communication server 710 can facilitate a chat session between network device 705 and bot agent 720. Bot agent 720 can autonomously communicate with network device 705 by exchanging one or more messages with the network device 705 during the chat session. Communication server 710 can dynamically determine whether to switch bot agent 720 with terminal device 715 (or in some cases, vice versa) so that a live agent can communicate with network device 705, instead of bot agent 710. In some implementations, the switching can be performed without a prompt from the network device 705. For example, the switching can be based on message parameters of the messages exchanged between the network device 705 and the bot agent 720, without prompting the network device 705 to request a terminal device.

In some implementations, communication server 710 can determine to switch between bot agent 720 and terminal device 715 automatically based on characteristics of the messages exchanged between the bot agent 720 and the network device 705. In some instances, analyzing the text of a message to determine the characteristic (e.g., the message parameter) can include an analysis of textual or non-textual attributes associated with the message. For example, communication server 715 can extract one or more lines of text included in the message from network device 705. Communication server 715 can identify whether the one or more lines of text include an anchor. Examples of an anchor include a string of text associated with a polarity (e.g., sentiment or intent, the word "frustrated" corresponding to a negative polarity or frustrated polarity, the word "happy" corresponding to a positive polarity, and so on). For example, a term "dispute" for one client can be negative, but can be neutral or positive for a second client. In some instances, anchors can be dynamically determined using supervised machine learning techniques. Further, one or more words near the identified anchor can be parsed for amplifiers. An example of an amplifier is a term that increases or decreases an intensity associated with the polarity of the anchor, such as "really," "not really," "kind of," and so on. The characteristic can include, for example, the speed of typing, the number of special characters used in the message (e.g., exclamation points, question marks, and so on), a semantic analysis of a message (e.g., by identifying keywords, sentence structures, repeated words, punctuation characters and/or non-article words); user input (e.g., having selected one or more categories); and/or message-associated statistics (e.g., response latency).

As a non-limiting example, the message parameter can be a numerical value that indicates the high intensity of the negative polarity (e.g., a message parameter of 20 on a scale of 0-100, with lower numbers indicating a negative polarity and higher numbers indicating a positive polarity). An algorithm can be used to calculate the message parameter. For example, the algorithm may be based on supervised machine learning techniques. In a further example, if the term "kind of" is near the anchor "don't like" (e.g., as in the sentence "I kind of don't like"), the term "kind of" may be identified as an amplifier term that indicates a medium intensity of the negative polarity. In this case, a message parameter can be generated based on the identification of the medium intensity of the negative polarity. As a non-limiting example, the message parameter can be a numerical value that indicates the medium intensity of the negative polarity (e.g., a message parameter of 40, as opposed to the message parameter of 20). In some instances, the message parameter can be used to determine which secondary queue is to store the communication.

In some implementations, the characteristic of a message can be the sentiment associated with the message. The message parameter can represent the sentiment of the message. For example, if the sentiment of the message is happy, the message parameter can be a certain value or range of values, whereas, if the sentiment of the message is angry, the message parameter can be another value or range of values. Determining whether to switch between the bot agent and the terminal device can be based on the message parameter, which is continuously and automatically updated with each new message received at communication server 715.

It will be appreciated that communication areas may facilitate audio or video communication between the user and the bot or live agent. The present application is not limited to messages being exchanged and displayed in the communication area. For example, the communication area may be a video feed that is continuously evaluated, such that whenever a new topic is discuss in the video feed, the dynamic content area automatically updates with new content elements that are associated with the new topic.

Figure 8A:
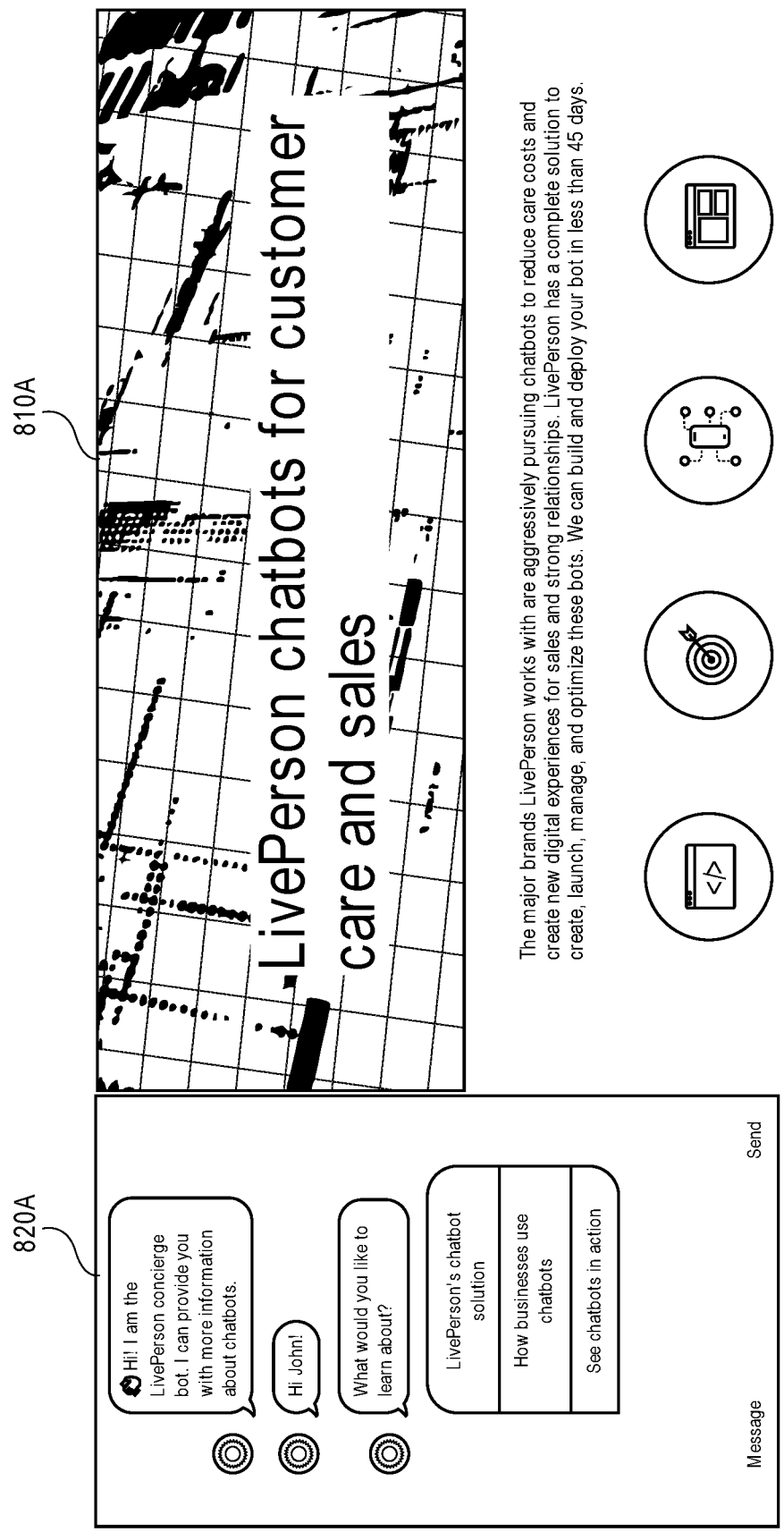
FIGS. 8A-8C show example website interfaces according to embodiments of the present disclosure.
Figure 8B:
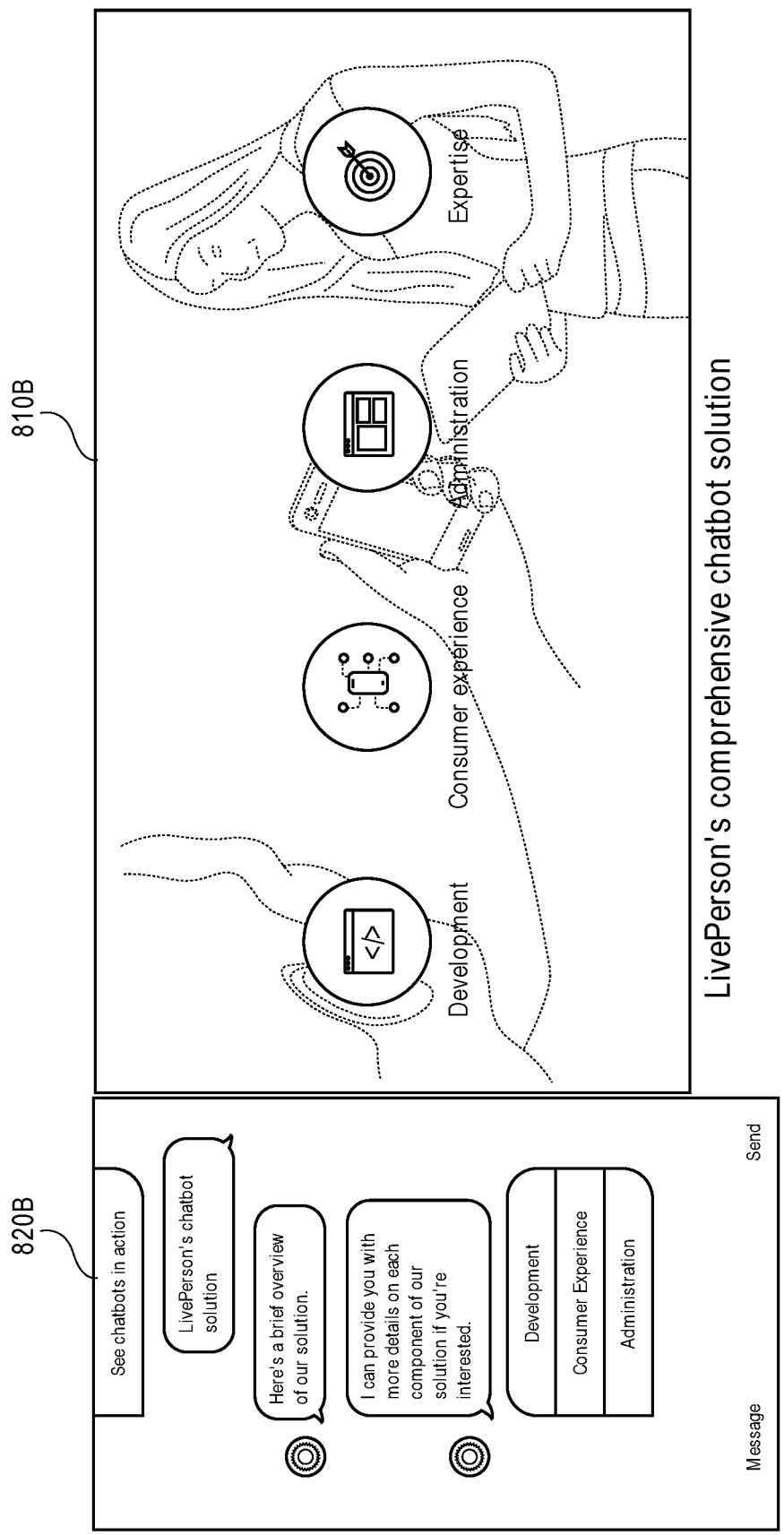
Figure 8C:
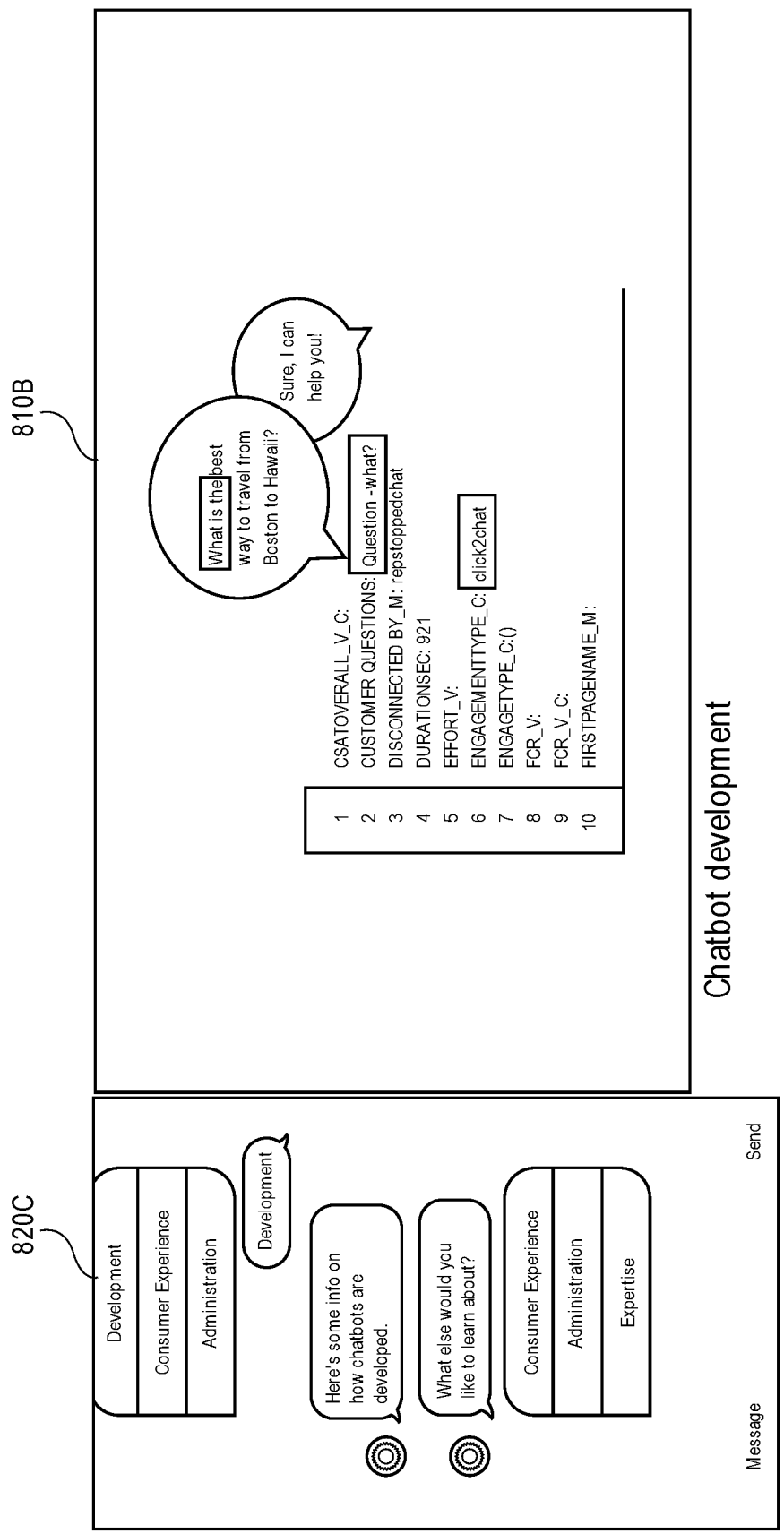

FIGS. 8A-8C illustrate example interfaces of a conversational website. For example, conversational website 800A may be configured to include communication area 820A and dynamic content area 810A. FIG. 8A illustrates that a bot can be configured to communicate with users in communication area 820A. Communication area 820A may represent a communication session between a bot or live agent and a user. For example, as illustrated in FIG. 8A, the bot provides three options for the user (e.g., LivePerson's chatbot solution, How businesses use chatbots, and See chatbots in action). As the bot and the user continue to chat, the messages will be displayed in communication area 820A, and the dynamic content area 810A will be continuously updated with new content specific to the messages exchanged between the bot and the user. Dynamic content area 810A may include an initial or default content element (e.g., at the beginning of the communication session between the user and the bot).

FIG. 8B illustrates the next state of the conversational website 800A. For example, one of the three options presented—"LivePerson's chatbot solution"—was selected by the user. Communication area 820B reflects the ongoing communication session between the user and the bot. As the user selected "LivePerson's chatbot solution," the bot presented three additional options (e.g., Development, Consumer Experience, and Administration). However, once the "LivePerson's chatbot solution" was selected, dynamic content area 810B was automatically updated with new content corresponding to the message "LivePerson's chatbot solution."

FIG. 8C illustrates the next state of the conversational website 800B. For example, one of the three options presented—"Development"—was selected by the user. Communication area 820C reflects the ongoing communication session between the user and the bot. As the user selected "Development," the bot presented three additional options (e.g., Consumer experience, administration, and expertise). Further, as the user selected "Development," dynamic content area 810C was updated with content corresponding to the message or messages of the communication session.

Figure 9:
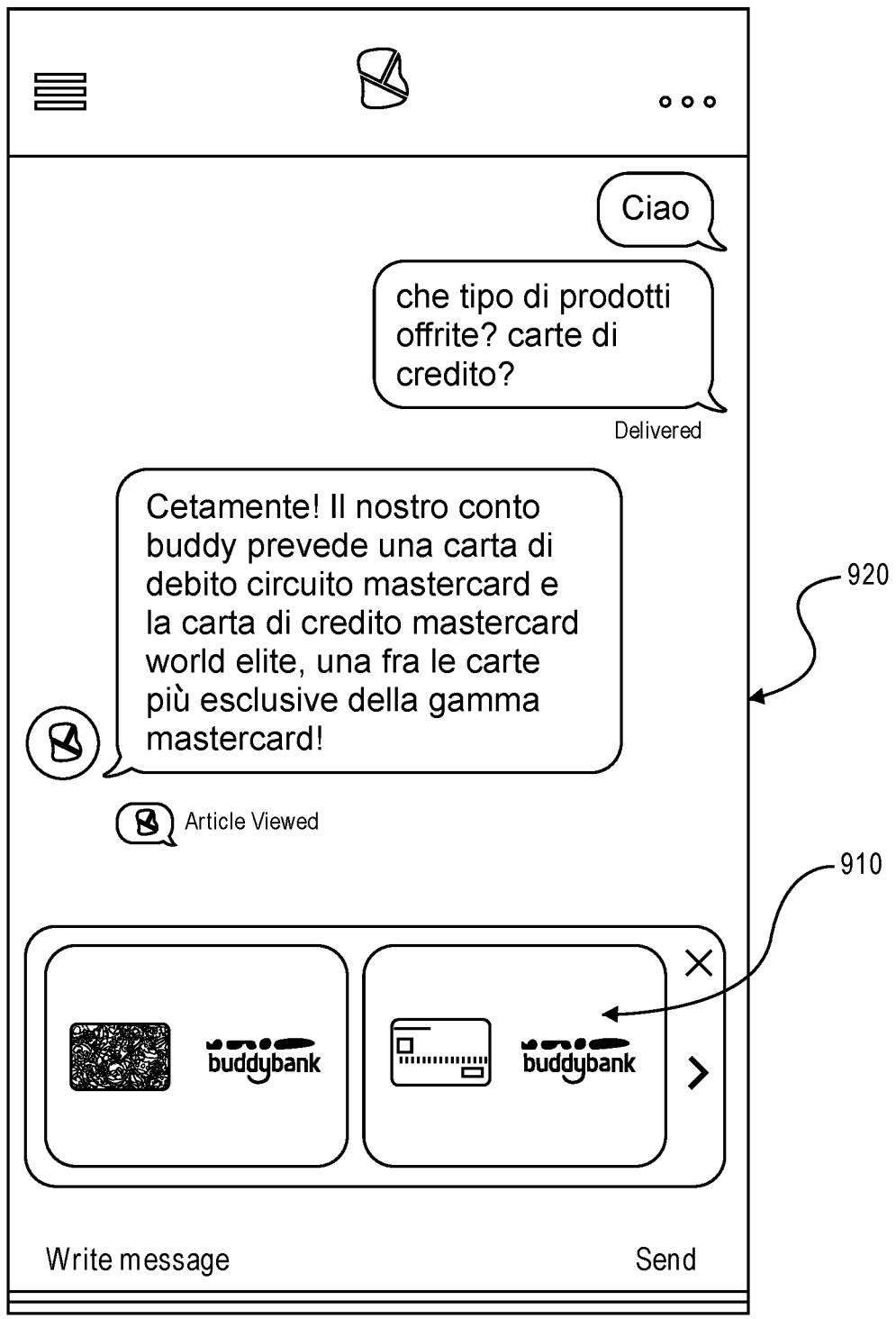
FIG. 9 shows an example native application interface according to embodiments of the present disclosure.

FIG. 9 illustrates an example conversational application executing on a mobile device (e.g., smartphone). The conversational application can display interface 900 on the screen of the mobile device. Similar to FIGS. 8A-8C, interface 900 can also include a conversational area 920 and a dynamic content area 910. However, as shown in FIG. 9, dynamic content area 910 is shown as a bubble (e.g., with two content elements inside). Each of the content elements included in the dynamic content area 910 may correspond to the content of the messages exchanged, as shown in the communication area 920.

It will be appreciated that FIGS. 8A-8C and 9 illustrate exemplary conversational websites and conversational native applications. However, communication areas and dynamic content areas can be formed in any size or shape. Further, the shape of the communication areas and dynamic content areas may not be static, but may be dynamic based on one or more factors, including the content of the messages exchanged between the bot or terminal device and the network device.

It will be appreciated that, while communication areas 820A, 820B, and 820C show messages where the bot provides options for the user to select, communication areas 820A, 820B, and 820C can consist of messages exchanged between the bot (or the live agent) and the user. Further, dynamic content areas 810A, 810B, and 810C can be updated based on the content of the messages included in the communication session, which are shown in communication area 820B. It will also be appreciated that dynamic content areas 810A, 810B, and 810C may be updated based on factors other than or in addition to the content of the messages. As a non-limiting example, the speed or frequency at which the user is transmitting messages during the communication session may be a factor in determining which content elements to display in the dynamic content area. It will also be appreciated that the content elements presented in the dynamic content area of the conversational website or application may be tracked, such that a history of content elements presented can be provided to the user.

Specific details are given in the above description to provide a thorough understanding of the embodiments. However, it is understood that the embodiments can be practiced without these specific details. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that portions of the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method, comprising:
   detecting in real-time a message exchanged between a user and a bot agent during an ongoing chat session, wherein the message is associated with an intent and a sentiment, and wherein the message is displayed through a communication area implemented through an interface of a native application;
   automatically retrieving a content element, wherein the content element is retrieved according to the intent and the sentiment, wherein the content element includes data that, when executed by the native application during the ongoing chat session, causes the native application to display a distinct and different content area within the interface, and wherein the content area is distinct and different from the communication area;
   providing the content element, wherein when the content element is received by the native application during the ongoing chat session, the native application automatically executes the data to display the content area and corresponding content associated with the message, and wherein the content is displayed within the content area that is distinct and different from the communication area;
   detecting in real-time a new message exchanged between the user and the bot agent during the ongoing chat session, wherein the new message is associated with a new intent and a new sentiment, and wherein the new message is displayed through the communication area while the content is concurrently displayed in the distinct and different content area; and
   dynamically updating the distinct and different content area to present a new content element, wherein the new content element is retrieved according to the new intent and the new sentiment, and wherein the distinct and different content area is dynamically updated during the ongoing chat session and while the new message is displayed in the communication area.

2. The computer-implemented method of claim 1, further comprising:
   calculating a polarity corresponding to the new sentiment; and
   automatically transferring the ongoing chat session from the bot agent to a live agent during the ongoing chat session, wherein the ongoing chat session is transferred based on the polarity.

3. The computer-implemented method of claim 1, wherein the communication area further facilitates audio communications between the user and the bot agent, and wherein the audio communications are continuously evaluated to identify intents and sentiments associated with the user.

4. The computer-implemented method of claim 1, wherein the sentiment is dynamically determined using supervised machine learning techniques.

5. The computer-implemented method of claim 1, wherein the intent and the sentiment are identified based on textual or non-textual characteristics associated with the message, and wherein the textual or non-textual characteristics include a speed of typing, a number of special characters used in the message, a semantic analysis of the message, user input, or message-associated statistics.

6. The computer-implemented method of claim 1, wherein the communication area and the content area are presented through the interface, and wherein the interface is provided on a screen of a mobile device.

7. The computer-implemented method of claim 1, further comprising:
   tracking the content element and the new content element to generate a history of content elements presented through the content area; and
   providing the history.

8. A system, comprising:
   one or more processors; and
   memory storing thereon instructions that, as a result of being executed by the one or more processors, cause the system to:
      detect in real-time a message exchanged between a user and a bot agent during an ongoing chat session, wherein the message is associated with an intent and a sentiment, and wherein the message is displayed through a communication area implemented through an interface of a native application;
      automatically retrieve a content element, wherein the content element is retrieved according to the intent and the sentiment, wherein the content element includes data that, when executed by the native application during the ongoing chat session, causes the native application to display a distinct and different content area within the interface, and wherein the content area is distinct and different from the communication area;
      provide the content element, wherein when the content element is received by the native application during the ongoing chat session, the native application automatically executes the data to display the content area and corresponding content associated with the message, and wherein the content is displayed within the content area that is distinct and different from the communication area;
      detect in real-time a new message exchanged between the user and the bot agent during the ongoing chat session, wherein the new message is associated with a new intent and a new sentiment, and wherein the new message is displayed through the communication area while the content is concurrently displayed in the distinct and different content area; and
      dynamically update the distinct and different content area to present a new content element, wherein the new content element is retrieved according to the new intent and the new sentiment, and wherein the distinct and different content area is dynamically updated during the ongoing chat session and while the new message is displayed in the communication area.

9. The system of claim 8, wherein the instructions further cause the system to:
   calculate a polarity corresponding to the new sentiment; and
   automatically transfer the ongoing chat session from the bot agent to a live agent during the ongoing chat session, wherein the ongoing chat session is transferred based on the polarity.

10. The system of claim 8, wherein the communication area further facilitates audio communications between the user and the bot agent, and wherein the audio communications are continuously evaluated to identify intents and sentiments associated with the user.

11. The system of claim 8, wherein the sentiment is dynamically determined using supervised machine learning techniques.

12. The system of claim 8, wherein the intent and the sentiment are identified based on textual or non-textual characteristics associated with the message, and wherein the textual or non-textual characteristics include a speed of typing, a number of special characters used in the message, a semantic analysis of the message, user input, or message-associated statistics.

13. The system of claim 8, wherein the communication area and the content area are presented through the interface, and wherein the interface is provided on a screen of a mobile device.

14. The system of claim 8, wherein the instructions further cause the system to:
   track the content element and the new content element to generate a history of content elements presented through the content area; and
   provide the history.

15. A non-transitory, computer-readable storage medium storing thereon executable instructions that, as a result of being executed by one or more processors of a computer system, cause the computer system to:
   detect in real-time a message exchanged between a user and a bot agent during an ongoing chat session, wherein the message is associated with an intent and a sentiment, and wherein the message is displayed through a communication area implemented through an interface of a native application;
   automatically retrieve a content element, wherein the content element is retrieved according to the intent and the sentiment, wherein the content element includes data that, when executed by the native application during the ongoing chat session, causes the native application to display a distinct and different content area within the interface, and wherein the content area is distinct and different from the communication area;
   provide the content element, wherein when the content element is received by the native application during the ongoing chat session, the native application automatically executes the data to display the content area and corresponding content associated with the message, and wherein the content is displayed within the content area that is distinct and different from the communication area;
   detect in real-time a new message exchanged between the user and the bot agent during the ongoing chat session, wherein the new message is associated with a new intent and a new sentiment, and wherein the new message is displayed through the communication area while the content is concurrently displayed in the distinct and different content area; and dynamically update the distinct and different content area to present a new content element, wherein the new content element is retrieved according to the new intent and the new sentiment, and wherein the distinct and different content area is dynamically updated during the ongoing chat session and while the new message is displayed in the communication area.

16. The non-transitory, computer-readable storage medium of claim 15, wherein the executable instructions further cause the computer system to:

calculate a polarity corresponding to the sentiment; and automatically transfer the ongoing chat session from the bot agent to a live agent during the ongoing chat session, wherein the ongoing chat session is transferred based on the polarity.

17. The non-transitory, computer-readable storage medium of claim 15, wherein the communication area further facilitates audio communications between the user and the bot agent, and wherein the audio communications are continuously evaluated to identify intents and sentiments associated with the user.

18. The non-transitory, computer-readable storage medium of claim 15, wherein the sentiment is dynamically determined using supervised machine learning techniques.

19. The non-transitory, computer-readable storage medium of claim 15, wherein the intent and the sentiment are identified based on textual or non-textual characteristics associated with the message, and wherein the textual or non-textual characteristics include a speed of typing, a number of special characters used in the message, a semantic analysis of the message, user input, or message-associated statistics.

20. The non-transitory, computer-readable storage medium of claim 15, wherein the communication area and the content area are presented through the interface, and wherein the interface is provided on a screen of a mobile device.

21. The non-transitory, computer-readable storage medium of claim 15, wherein the executable instructions further cause the computer system to:

track the content element and the new content element to generate a history of content elements presented through the content area; and provide the history.

* * * * *